(12) United States Patent
Woodrum

(10) Patent No.: US 9,327,553 B2
(45) Date of Patent: May 3, 2016

(54) MOWER WITH FRONT CASTER WHEEL SUSPENSION

(71) Applicant: MTD Products Inc, Valley City, OH (US)

(72) Inventor: Adam Woodrum, Wakeman, OH (US)

(73) Assignee: MTD PRODUCTS INC, Valley City, OH (US)

( * ) Notice: Subject to any disclaimer, the term of this patent is extended or adjusted under 35 U.S.C. 154(b) by 0 days.

(21) Appl. No.: 14/310,250

(22) Filed: Jun. 20, 2014

(65) Prior Publication Data

US 2015/0367695 A1  Dec. 24, 2015

(51) Int. Cl.
| | |
|---|---|
| *A01D 34/64* | (2006.01) |
| *B60B 33/04* | (2006.01) |
| *B60G 7/00* | (2006.01) |
| *B60G 11/14* | (2006.01) |
| *B60G 11/16* | (2006.01) |
| *B60G 17/00* | (2006.01) |

(52) U.S. Cl.
CPC .............. *B60B 33/045* (2013.01); *A01D 34/64* (2013.01); *B60G 7/001* (2013.01); *B60G 11/14* (2013.01); *B60G 11/16* (2013.01); *B60G 17/00* (2013.01); *B60G 2204/1244* (2013.01); *B60G 2300/084* (2013.01)

(58) Field of Classification Search
CPC ................... B60G 11/14; B60G 11/16; B60G 2204/1244; B60G 2300/084; A01D 34/64; B60B 33/045
USPC .......................... 16/44, 18 R; 56/14.7; 280/92
See application file for complete search history.

(56) References Cited

U.S. PATENT DOCUMENTS

| | | | | |
|---|---|---|---|---|
| 1,422,671 | A | * 7/1922 | Cochran | ........................ 280/92 |
| 2,490,560 | A | 12/1949 | Urquhart, Jr. | |
| 2,502,309 | A | 3/1950 | Byrd | |
| 2,577,244 | A | * 12/1951 | Hedgpeth | ......................... 16/44 |
| 2,648,271 | A | 8/1953 | Byron | |
| 2,761,692 | A | 9/1956 | Sisulak | |
| 2,915,776 | A | * 12/1959 | Hanson et al. | .................... 16/44 |
| 3,194,578 | A | 7/1965 | Kiecker | |
| 4,178,005 | A | 12/1979 | Kent, Jr. | |

(Continued)

FOREIGN PATENT DOCUMENTS

| | | |
|---|---|---|
| AU | 773976 B2 | 3/2001 |
| CA | 2273790 A1 | 5/1999 |

(Continued)

OTHER PUBLICATIONS

Advertisement: Dixie Chopper, Xcaliber—Diesel 3666D & 3674D, Sep. 9, 2011.

(Continued)

*Primary Examiner* — Ruth Ilan

(74) *Attorney, Agent, or Firm* — Wegman, Hessler & Vanderburg; Benjamin Cotton; Jason Worgull

(57) ABSTRACT

A lawn maintenance vehicle caster wheel assembly includes a suspension and a fork. The fork is rotatably connected to a structural member of the lawn maintenance vehicle. The caster wheel assembly also includes an arm connected to the fork, and the arm is rotatable about an arm axis. The caster wheel assembly further includes a caster wheel mounted to the arm and is rotatable about a wheel axis. A damping member is attached to the fork and the arm such that the caster wheel and the arm can rotate about the arm axis.

8 Claims, 5 Drawing Sheets

(56) References Cited

U.S. PATENT DOCUMENTS

| | | | |
|---|---|---|---|
| 4,441,306 A | | 4/1984 | Kuhn |
| 4,534,433 A | * | 8/1985 | Burbank et al. ............. 180/19.1 |
| 4,589,249 A | | 5/1986 | Walker et al. |
| 4,690,427 A | * | 9/1987 | Raidel, Sr. ............. 280/124.118 |
| 4,823,895 A | | 4/1989 | Kimball |
| 5,066,030 A | * | 11/1991 | Brett et al. ...................... 280/92 |
| 5,347,680 A | | 9/1994 | Rippe |
| 5,355,664 A | | 10/1994 | Zenner |
| 6,094,846 A | | 8/2000 | Feller |
| 6,357,077 B1 | | 3/2002 | Jones, Jr. et al. |
| 6,371,228 B1 | | 4/2002 | Husted et al. |
| 6,460,318 B1 | | 10/2002 | Ferris et al. |
| 6,510,678 B2 | | 1/2003 | Ferris et al. |
| 6,543,798 B2 | | 4/2003 | Schaffner et al. |
| 6,594,980 B2 | | 7/2003 | Oka et al. |
| 6,698,172 B2 | | 3/2004 | Ferris et al. |
| 6,729,116 B1 | | 5/2004 | Graus et al. |
| 6,857,254 B2 | | 2/2005 | Melone et al. |
| 7,007,761 B1 | | 3/2006 | Johnson, IV |
| 7,107,746 B2 | | 9/2006 | Melone et al. |
| 7,152,389 B2 | | 12/2006 | Melone et al. |
| 7,587,886 B1 | | 9/2009 | Sugden |
| 7,708,292 B2 | | 5/2010 | Foster |
| 7,882,914 B2 | | 2/2011 | Scheele et al. |
| 7,930,813 B2 | | 4/2011 | Melone et al. |
| 2002/0190492 A1 | * | 12/2002 | Strong ................... 280/124.128 |
| 2009/0064650 A1 | | 3/2009 | Eberle et al. |
| 2011/0192128 A1 | | 8/2011 | Nance |
| 2011/0192330 A1 | | 8/2011 | Logan et al. |
| 2011/0193309 A1 | | 8/2011 | Nance |
| 2011/0254241 A1 | | 10/2011 | Piontek |
| 2011/0277433 A1 | | 11/2011 | Sugden et al. |

FOREIGN PATENT DOCUMENTS

| | | | |
|---|---|---|---|
| CN | 103 786 541 | | 5/2014 |
| FR | 1112584 A | * | 3/1956 |
| GB | 873 184 | | 7/1961 |
| JP | 2002-101725 | | 4/2002 |
| JP | 2003182304 | | 7/2003 |
| JP | 2012116336 | | 6/2012 |

OTHER PUBLICATIONS

International Search Report and Written Opinion for corresponding International Patent Application No. PCT/US2015/035958 dated Sep. 9, 2015.

* cited by examiner

MOWER WITH FRONT CASTER WHEEL SUSPENSION

BACKGROUND

1. Field of the Disclosure

This application relates generally to lawn maintenance vehicles, and more specifically to lawn maintenance vehicles including caster wheels.

2. Description of Related Art

Many lawn maintenance vehicles, such as zero-turn riding mowers include caster wheels. Many of the currently available mowers include caster wheel assemblies that have no flexible suspension. During normal operation, the wheeled lawn maintenance vehicle may be driven over surfaces having irregularities, and/or small obstacles. As the front casters pass over the irregularities and/or small obstacles, potentially jarring movement of vertical translation of the casters is often passed directly to the frame of the wheeled lawn maintenance vehicle and the driver. The lack of flexible suspension between the casters and the frame of the lawn maintenance vehicle can cause a jarring ride for the operator.

Furthermore, some caster wheel assemblies include a flexible suspension element, such as a spring, oriented in a generally vertical direction. Such spring orientations can cause a slight but significant series of bounces in the lawn maintenance vehicle which causes an undesired sinusoidal variation in the cut elevation of the lawn maintenance vehicle cutting blades. Accordingly, improvements to lawn maintenance vehicle caster wheels are desired.

SUMMARY

The following presents a simplified summary in order to provide a basic understanding of some example aspects of the disclosure. This summary is not an extensive overview. Moreover, this summary is not intended to identify critical elements of the disclosure nor delineate the scope of the disclosure. The sole purpose of the summary is to present some concepts in simplified form as a prelude to the more detailed description that is presented later.

According to one aspect, the subject application involves a lawn maintenance vehicle caster wheel assembly including a suspension. The caster wheel assembly includes a fork. The fork is rotatably connected to a structural member of the lawn maintenance vehicle. The caster wheel assembly also includes an arm which is rotatably connected to the fork at a first location. The arm is rotatable about an arm axis. The caster wheel assembly further includes a caster wheel mounted to the arm. The caster wheel is rotatable about a wheel axis. The caster wheel assembly still further includes a damping member. The damping member is attached to the fork and the arm such that the caster wheel and the arm can rotate about the arm axis.

According to another aspect, the subject application involves a lawn maintenance vehicle including a lawn maintenance vehicle caster wheel assembly. The caster wheel assembly includes a suspension. The suspension includes a fork which is rotatably connected to a structural member of the lawn maintenance vehicle. The suspension also includes an arm. The arm is rotatably connected to the fork at a first location, and the arm is rotatable about an arm axis. The suspension further includes a caster wheel mounted to the arm. The caster wheel is rotatable about a wheel axis. The suspension still further includes a damping member. The damping member is attached to the fork and the arm such that the caster wheel and the arm can rotate about the arm axis.

BRIEF DESCRIPTION OF THE DRAWINGS

The foregoing and other aspects of the present disclosure will become apparent to those skilled in the art to which the present disclosure relates upon reading the following description with reference to the accompanying drawings, in which.

DETAILED DESCRIPTION

Figure 1:
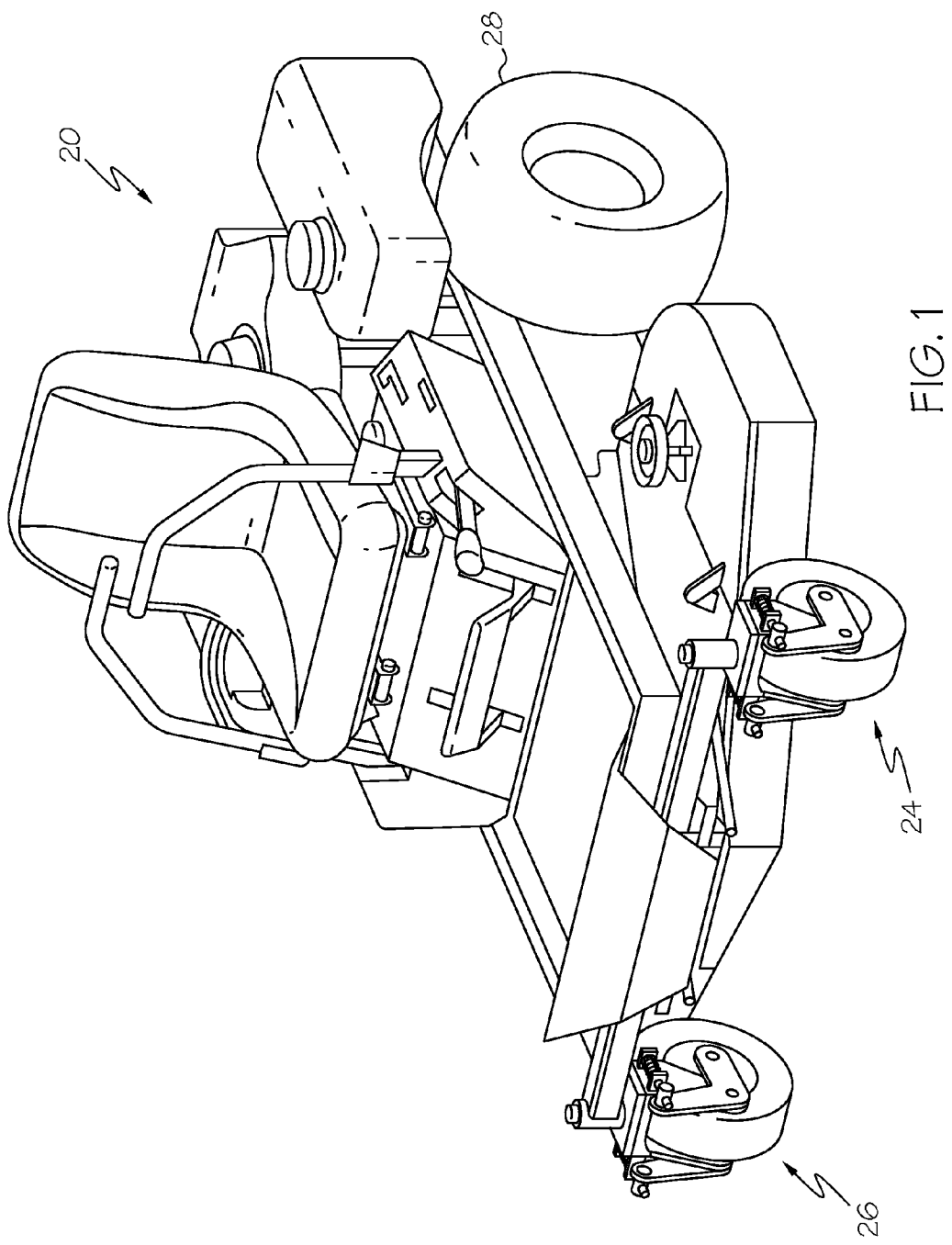
FIG. 1 is a perspective view of a lawn maintenance vehicle including a caster wheel assembly in accordance with aspects of the present disclosure.

Example embodiments that incorporate one or more aspects of the present disclosure are described and illustrated in the drawings. These illustrated examples are not intended to be a limitation on the present disclosure. For example, one or more aspects of the present disclosure can be utilized in other embodiments and even other types of devices. Moreover, certain terminology is used herein for convenience only and is not to be taken as a limitation on the present disclosure. Still further, in the drawings, the same reference numerals are employed for designating the same elements.

FIG. 1 shows a perspective view of an example lawn maintenance vehicle 20 according to at least one aspect of the present disclosure. The shown lawn maintenance vehicle 20 is a zero-turn riding mower, which is merely an example, and is not meant to be limiting of the type of lawn maintenance vehicle. The lawn maintenance vehicle 20 includes a caster wheel assembly 24. In one example, the caster wheel assembly 24 can be attached at the forward end 26 of the lawn maintenance vehicle 20. In one example, the lawn maintenance vehicle 20 can be powered by at least one powered wheel 28 located at the rear of the lawn maintenance vehicle 20 while the caster wheel assembly 24 is not powered and rotates freely according to the movements of the powered wheel 28.

Figure 2:
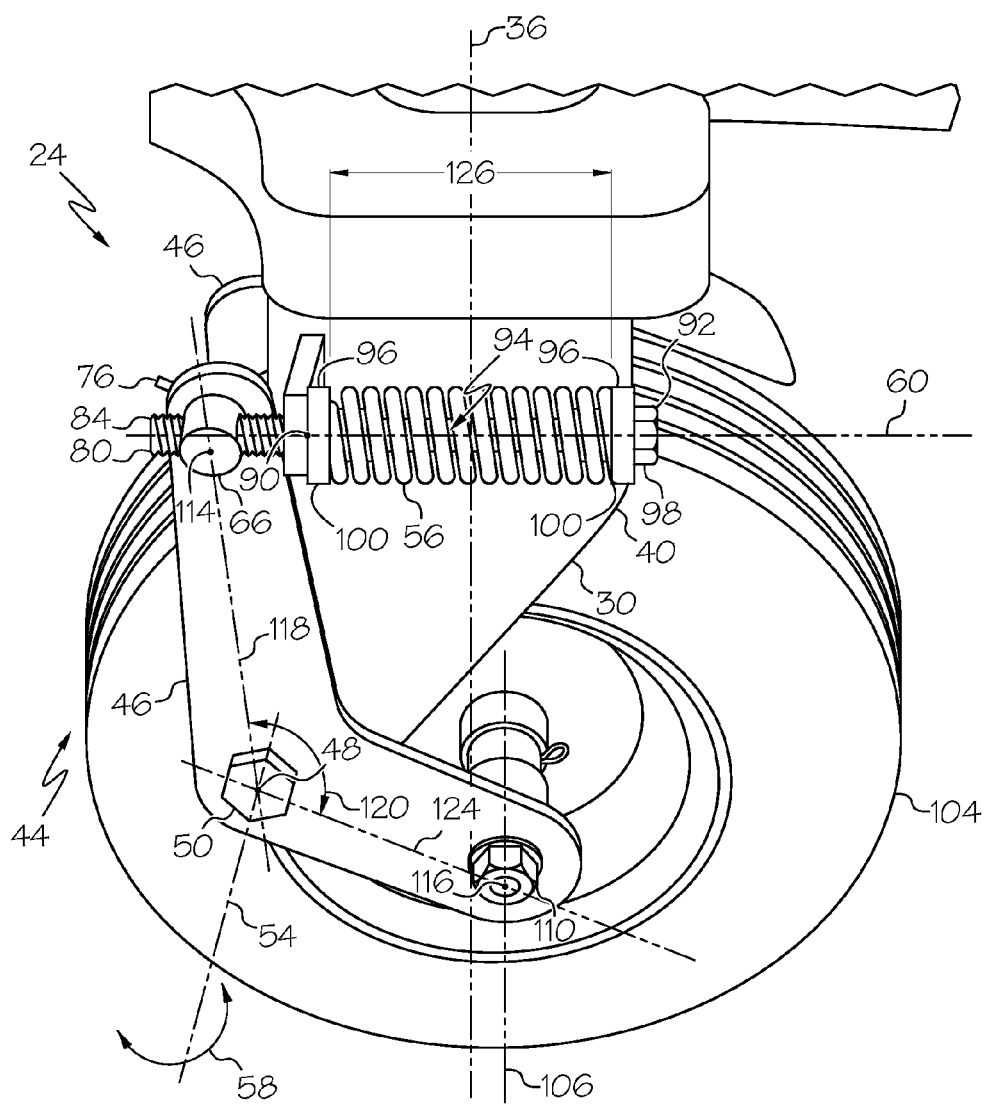
FIG. 2 is a detail side view of one embodiment of the caster wheel assembly of the lawn maintenance vehicle of FIG. 1.

Turning to FIG. 2, the caster wheel assembly 24 includes a fork 30. The fork 30 is rotatably connected to a structural member (not shown) of the lawn maintenance vehicle 20. Any suitable rotatable connection can be used to enable the fork 30 to freely rotate about a vertical axis represented by line 36. In one example, the fork 30 can include a cross bar 38, to which the rotatable connection can be attached. The fork 30 can include a first fork side 40 which extends in a generally downward direction from the cross bar 38. In another example, the fork 30 can include a first fork side 40 and a second fork side 42 (best seen in FIG. 3), which both extend in a generally downward direction from the cross bar 38.

The caster wheel assembly 24 also includes a suspension assembly 44. The suspension assembly 44 includes several components which are now described. The suspension assembly 44 includes an arm 46 which is rotatably connected to the fork 30 at a first location 48. Any suitable rotatable connection can be provided between the arm 46 and the fork 30. As shown in FIG. 2, the rotatable connection can be a threaded fastener 50 extending from the arm 46 to the fork 30. The rotatable connection enables the arm 46 to rotate about an arm axis represented by line 54 which passes through the first location 48.

The suspension assembly 44 also includes a damping member 56. In the embodiment illustrated in FIGS. 1-3, the damping member 56 is shown as a coil spring. I will be appreciated, however, that any suitable damping member can be used without departing from the scope of the disclosure. The damping member 56 is attached to the fork 30 and the arm 46. This attachment orientation enables the caster wheel to rotate about the arm axis 54 in a direction represented by arrow 58. The damping member 56 includes a central axis 60, and the central axis 60 can be oriented in a substantially horizontal orientation. The damping member 56 can be attached to the fork 30 and the arm 46 in any number of ways, and the illustrations of the figures are not limiting in the damping member 56 attachment methods or structures.

Figure 3:
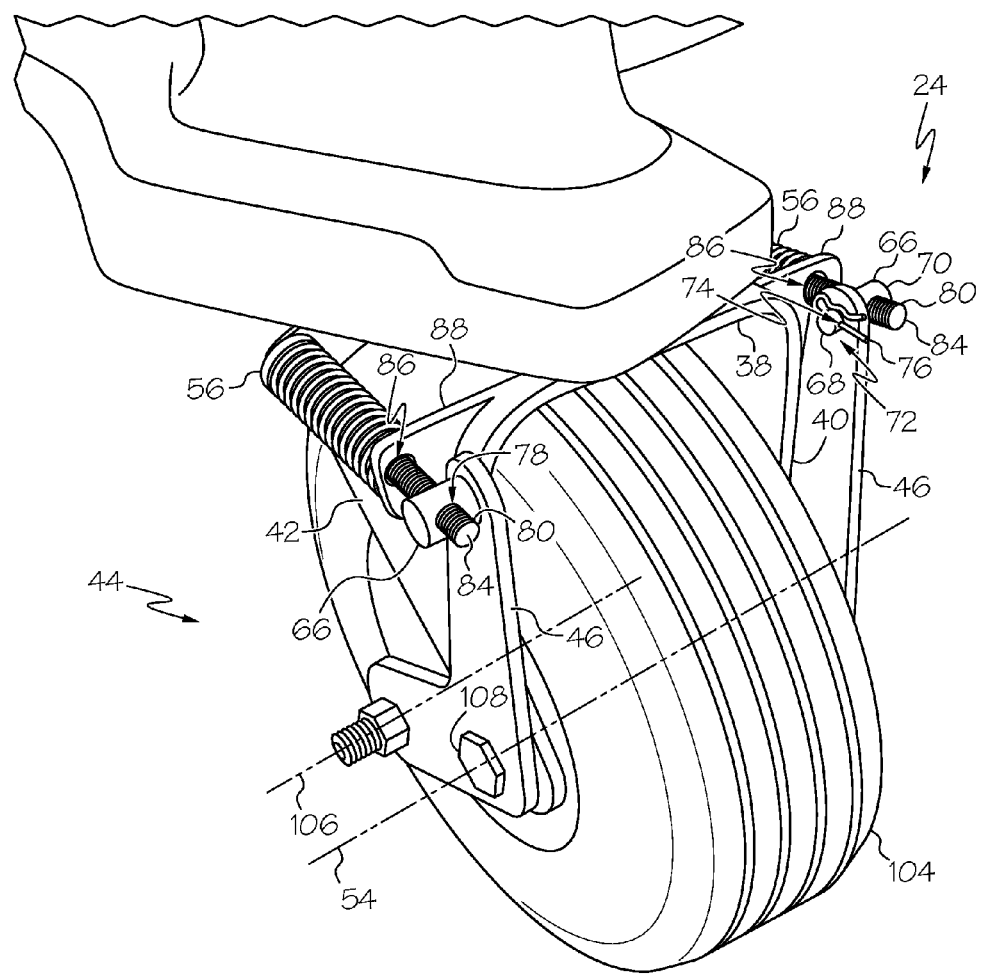
FIG. 3 is a detail front view of the caster wheel assembly of FIG. 2.

In one example, a pin 66 is attached to the arm 46. The pin 66 can be attached to the arm 46 by any suitable mechanism. As shown in FIG. 3, the pin 66 can include a length 68 of reduced diameter and a length 70 of larger diameter, enabling only the length 68 of the pin 66 to pass through an aperture 72 in the arm 46. In turn, the length 68 of reduced diameter can define another aperture 74. A cotter pin 76 or other similar device passes through the aperture 74 to help prevent the pin 66 from separating from the arm 46. As such, the length 68 of reduced diameter can be placed on an interior side of the arm 46 while the length 70 of larger diameter remains on an exterior side of the arm 46. Additionally, this attachment method enables the pin 66 to rotate, at least through a relatively small angle.

The length 70 of the larger diameter of pin 66 can define an aperture 78. The aperture 78 can define female threads. The suspension assembly 44 can include a threaded fastener 80 which can be threadingly engaged with the aperture 78. Threaded engagement with the aperture 78 provides attachment structure for a first end 84 the threaded fastener 80 to the arm 46. The threaded fastener 80 can then pass through an aperture 86 defined by a tab 88 which is attached to the first fork side 40. In one example, the aperture 86 is a through-hole providing clearance between the threaded fastener 80 and the inside diameter of the aperture 86 such that the threaded fastener 80 can freely move in translation relative to the tab 88. With the described attachment structure, the arm 46 can be connected to the fork 30 at the first location 48 and at a second location 90 through the damping member 56.

Proceeding toward a second end 92 of the threaded fastener 80, the threaded fastener 80 can pass through a central space 94 of the damping member 56. A main axis of the threaded fastener 80 can be collinear with the central axis 60 of the damping member 56. A washer 96 can be located at each end of the damping member 56. In this arrangement, the washer 96 can prevent a bolt head 98 located at the second end 92 from entering the central space 94 of the damping member 56. Additionally, each washer 96 can define a central aperture used as a clearance hole for the threaded fastener 80. In one example, each washer 96 can include a collar portion 100 remaining on the outside of the damping member 56 and an elongated portion having a reduced diameter which seats within the central space 94 of the damping member 56.

The caster wheel assembly 24 also includes a caster wheel 104 mounted to the arm 46. Any suitable caster wheel can be used, including pneumatic tires, solid rubber wheels, etc. The caster wheel 104 is mounted about a wheel axis, represented by line 106. Any suitable wheel mounting structure can be used to mount the caster wheel 104 to the arm 46. In one example, as shown in FIG. 2, the mounting structure can include a threaded fastener 108 and a machine nut 110. As can be readily understood, the mounting structure can act as an axle about which the caster wheel 104 can freely rotate. Other examples of a wheel mounting structure can include pins, specially designed axles, etc.

In one example, the arm 46 can be an angled linkage. As shown in FIG. 2, the arm 46 can include a first end point 114, a second end point 116, and a first pivot point (e.g., the first location 48) such that a first line 118 between first end point 114 and the first location 48 forms a non-linear angle 120 with a second line 124 between the second end point 116 and the first location 48. The non-linear angle 120 and the lengths of the first line 118 and the second line 124 can be calculated to produce a number of desired suspension characteristics of the caster wheel assembly 24.

Furthermore, the threaded fastener 80 can be operated to adjust an elastic potential energy within the damping member 56 to affect a stiffness of the suspension assembly 44. It is to be appreciated that the action of adjusting the elastic potential energy can be considered essentially the same as adjusting the damping or adjusting the stiffness of the damping member 56, and therefore, the suspension assembly 44. For example, increasing the number of turns through which the threaded fastener 80 has engaged the pin 66, draws the bolt head 98 closer to the tab 88, thereby decreasing a length 126 of the damping member 56. As the length 126 of the damping member 56 is shortened, the elastic potential energy within the damping member 56 increases which results in an increased stiffness of the suspension assembly 44. As such, when the caster wheel 104 encounters surface irregularities as it rolls over a surface, the caster wheel 104 and the arm 46 will rotate as a unit about the arm axis 54 rather than directly transmitting the forces to the frame of the lawn maintenance vehicle 20, thereby providing a less jarring ride for an operator of the lawn maintenance vehicle 20. The shorter the length 126 of the damping member 56, the stiffer the suspension. Conversely, decreasing the number of turns through which the threaded fastener 80 has engaged the pin 66, urges the bolt head 98 to move farther from the tab 88, thereby increasing the length 126 of the damping member 56. This increased length 126 decreases the elastic potential energy within the damping member 56, thereby decreasing the stiffness of the suspension assembly 44.

It is also to be understood that the damping member 56 can urge the first end point 114 of the arm 46 toward fork 30 and rotates the arm 46 about the first pivot point. Additionally, increasing and decreasing the number of turns through which the threaded fastener 80 has engaged the pin 66 can urge the first end point 114 of the arm 46 toward and away from the fork 30.

In addition, it will be understood that the damping member 56 can be selected with properties to provide a desired suspension performance by varying characteristics of the damping member 56. For example, in the case of the damping member 56 being a coil spring, the spring can be selected with a particular pitch, length, number of coils, width, and/or coil geometry to provide a desired suspension performance.

Returning to FIG. 2, a brief description of the operation of the caster wheel assembly 24 follows. During the course of operation, the caster wheel assembly 24 travels generally from right to left as the lawn maintenance vehicle 20 moves across a lawn. As an example, during travel, the caster wheel assembly 24 encounters a rock or other irregular surface feature (not shown), the caster wheel 104 is urged in an upward direction to traverse the rock or other impediment. This causes rotation of the arm 46 to rotate in a counter-clockwise direction of arrow 58 about the arm axis 54. This causes the pin 66 to rotate away from the damping member 56. The threaded engagement of the threaded fastener 80 to the pin 66 causes the threaded fastener 80 to move generally to the left. This motion causes the damping member 56 to be compressed between the moving bolt head 98 and the stationary tab 88 (called out in FIG. 3). As such, the generally vertical jarring motion of the irregular surface feature is converted to a motion that has a significant horizontal motion component.

The damping member 56, with an increased elastic potential energy, then tends applies greater force to urge the bolt head 98 to the right. As the bolt head 98 moves to the right, the damping member 56 increases in length, and the threaded fastener 80 urges the arm 46 to rotate in a clockwise direction of arrow 58 about the arm axis 54. This rotation generally lowers the caster wheel 104. From this description, it can be easily understood that the upward and downward forces on the lawn maintenance vehicle 20 and its frame members are transferred to the damping member 56 which minimizes the displacement of the operator of the lawn maintenance vehicle 20 with respect to the ground.

Figure 4:
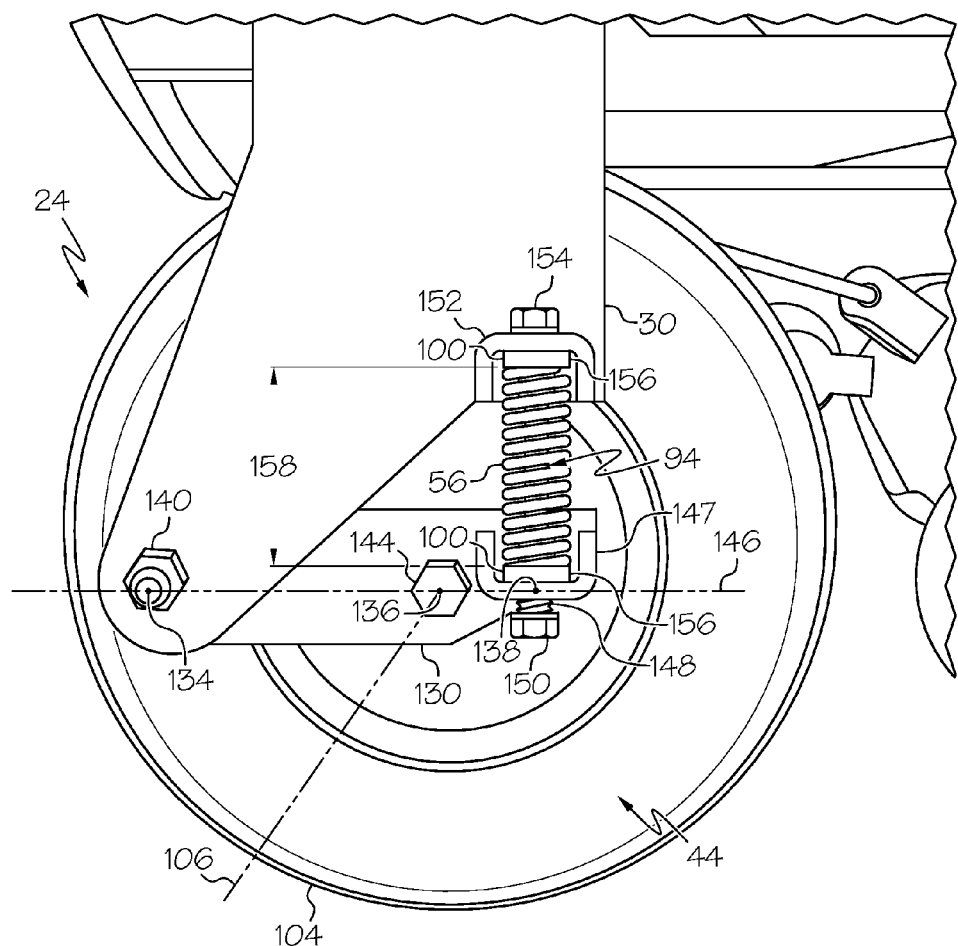
FIG. 4 is a detail side view of a second embodiment of the caster wheel assembly of the lawn maintenance vehicle of FIG. 1.
Figure 5:
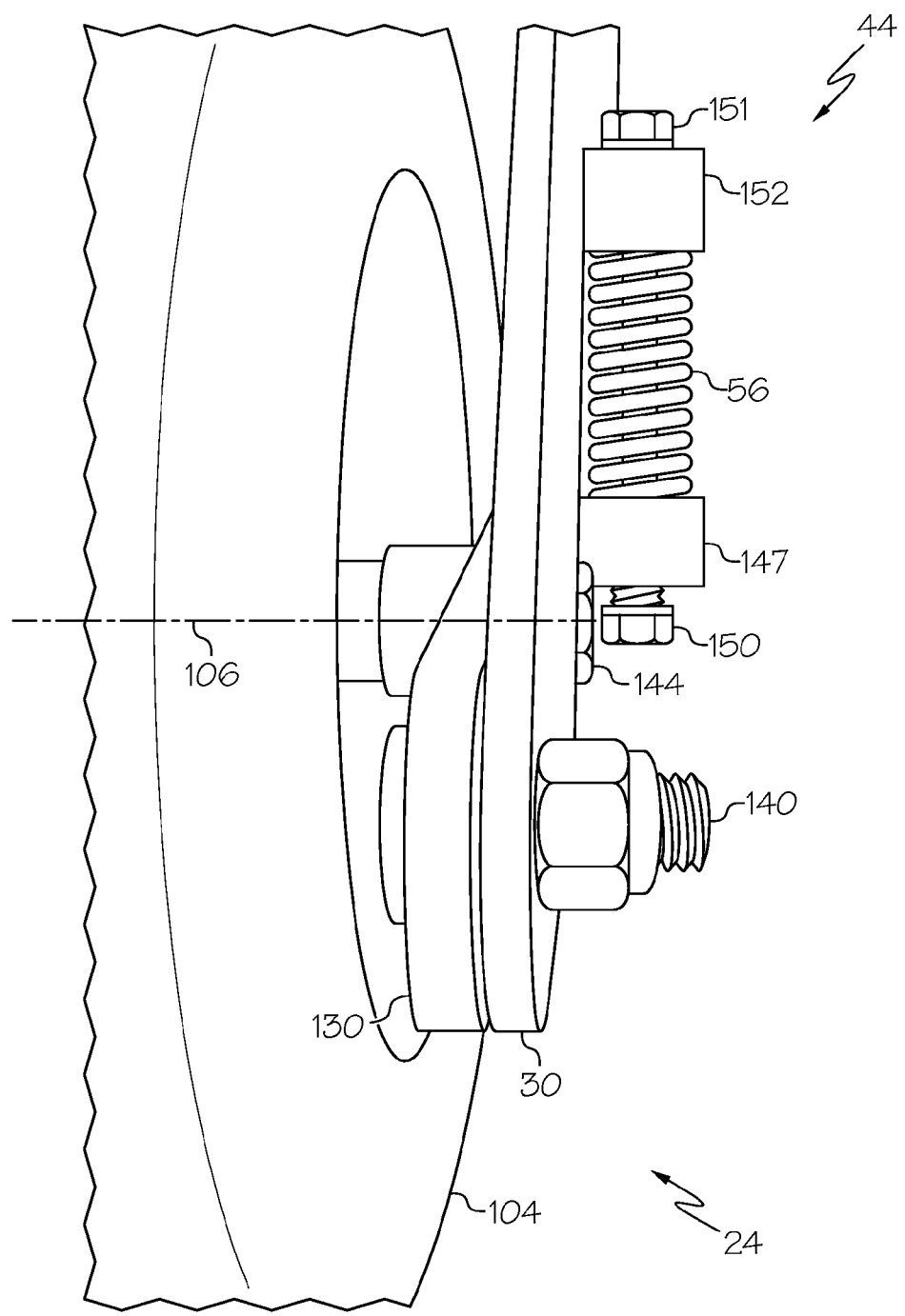
FIG. 5 is a partial detail front view of the caster wheel assembly of FIG. 4.

Turning to FIGS. 4 and 5, another embodiment of the caster wheel assembly 24 is shown. In this embodiment, the arm 130 includes a second pivot point 134, an axis point 136, and a third end point 138. The arm 130 is rotatably attached to the fork 30 at the second pivot point 134. Any suitable attachment structure can be used, including, but not limited to a threaded fastener 140. The caster wheel 104 is mounted about a wheel axis, represented by line 106 which passes through the axis point 136 located on the arm 130. Any suitable wheel mounting structure can be used to mount the caster wheel 104 to the arm 130. In one example, the mounting structure can include a threaded fastener 144. As can be readily understood, the mounting structure can act as an axle about which the caster wheel 104 can freely rotate. In this embodiment, a third line 146 between the second pivot point 134, the axis point 136, and the third end point 138 forms a substantially straight line.

The third end point 138 of the arm 130 can include a tab 147. The tab 147 defines a through-hole for another threaded fastener 148 oriented in a substantially vertical position which passes through the central portion 94 of the damping member 56, for example, a coil spring. The through-hole has a diameter that is smaller than the outside dimension of a bolt head 150, such that the bolt head 150 cannot pass through the through hole. The threaded fastener 148 can also pass through an aperture in another tab 152 which is mounted to the fork 30. The aperture of tab 152 has a diameter that is smaller than the outside dimension of a hex nut 154 such that the hex nut 154 cannot pass through the aperture.

A washer 156 can be located at each end of the damping member 56. In this arrangement, the washer 156 can help centrally locate the threaded fastener 148 within the central space 94 of the damping member 56. Additionally, each washer 156 can define a central aperture used as a clearance hole for the threaded fastener 148. In one example, each washer 156 can include a collar portion 100 remaining on the outside of the damping member 56 and an elongated portion having a reduced diameter which seats within the central space 94 of the damping member 56. Similar to the first embodiment, the arm 130 can be connected to the fork 30 at two locations: at the second pivot point 134 and at the third end point 138 through the damping member 56.

The threaded fastener 148 can be operated to adjust the elastic potential energy within the damping member 56 to affect the stiffness of the suspension assembly 44. For example, increasing the number of turns through which the threaded fastener 148 has engaged the hex nut 154, draws the tab 147 closer to the tab 152, thereby decreasing a length 158 of the damping member 56. As the length 158 of the damping member 56 is shortened, the elastic potential energy within the damping member 56 increases which results in an increased stiffness of the suspension assembly 44. As such, when the caster wheel 104 encounters surface irregularities as it rolls over a surface, the caster wheel 104 and the arm 130 will rotate as a unit about the arm axis 54 rather than directly transmitting the forces to the frame of the lawn maintenance vehicle 20, thereby providing a less jarring ride for an operator of the lawn maintenance vehicle 20. The shorter the length 158 of the damping member 56, the stiffer the suspension. Conversely, decreasing the number of turns through which the threaded fastener 148 has engaged the hex nut 154, in combination with force from the damping member 56, urges the tab 147 to move farther from the tab 152, thereby increasing the length 158 of the damping member 56. This increased length 158 decreases the elastic potential energy within the damping member 56, thereby decreasing the stiffness of the suspension assembly 44.

The described combination of components can provide several advantages. In one example, the caster wheel includes a suspension which can lessen and/or eliminate jarring ride qualities for an operator of the lawn maintenance vehicle. In another example, particularly one in which the damping member is oriented in a substantially horizontal orientation, the caster wheel suspension can reduce and/or eliminate lawn maintenance vehicle bounce. At times, the lawn maintenance vehicle may traverse terrain that has a particularly large bump, depression, or other abnormality. Wheel suspensions of the past often included springs oriented in a substantially vertical orientation, which, after traveling over the abnormality, tend to have a bounce frequency. The bounce frequency then causes the lawn maintenance vehicle and the cutting blades to change elevation along the mowing path. This bounce, even if it decays in a short time, produces an undesirable sinusoidal cut of the grass. Instead, the above described caster wheel suspension reduces and/or eliminates the lawn maintenance vehicle bounce.

Additionally, the described combination of components can maximize damping while minimizing any additional vertical height requirements of the suspension assembly located on the caster wheel assembly. For example, a relatively long horizontal coil spring has no impact or minimal impact upon the overall height of the caster wheel assembly. In this way, the lawn maintenance vehicle can include a suspension system with little to no additional required overall height.

Furthermore, the described combination of components can maximize a desired damping force while minimizing undesired movement in the vertical direction (or Z-axis). Also, the described combination of components includes a hard stop, or an "up stop," in the design. For example, as the caster wheel is rotated about the arm axis, it is limited in its maximum rotation of counter-clockwise travel as the damping member (here, a coil spring) will reach its closed length when the spring is deflected under sufficient load to bring all the adjacent coils into contact. At this point, no additional deflection is possible, and the caster wheel is at its maximum height or deflection.

While this disclosure has been written in conjunction with the specific embodiments described above, it is evident that many alternatives, combinations, modifications and variations are apparent to those skilled in the art. Accordingly, the described embodiments of this disclosure, as set forth above are intended to be illustrative only, and not in a limiting sense. Various changes can be made without departing from the spirit and scope of this disclosure. Combinations of the above embodiments and other embodiments will be apparent to those of skill in the art upon studying the above description and are intended to be embraced therein. Therefore, the scope of the present disclosure is defined by the appended claims, and all devices, processes, and methods that come within the meaning of the claims, either literally or by equivalence, are intended to be embraced therein. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A lawn maintenance vehicle caster wheel assembly including a suspension comprising:
    a fork, wherein said fork is rotatably connected to a structural member of an associated lawn maintenance vehicle;
    an arm, wherein said arm is rotatably connected to said fork at a first location, wherein said arm is rotatable about an arm axis;
    a caster wheel mounted to said arm, wherein said caster wheel is rotatable about a wheel axis; and
    a damping member, wherein said damping member is attached to said fork and said arm such that said caster wheel and said arm can rotate about said arm axis;
    wherein said arm includes a first end point, a second end point, and a first pivot point such that a first line between said first end point and said first pivot point forms a non-linear angle with a second line between said second end point and said first pivot point;
    wherein said damping member urges said first end point of said arm toward said fork, to rotate said arm about said first pivot point;
    wherein said damping member is a coil spring, and wherein said coil spring includes a central axis, and said central axis is oriented in a substantially horizontal orientation.

2. The lawn maintenance vehicle caster wheel assembly according to claim 1, wherein said caster wheel is rotatable about a vertical axis.

3. The lawn maintenance vehicle caster wheel assembly according to claim 1, wherein said arm is connected to said fork at said first location and at a second location through said damping member.

4. The lawn maintenance vehicle caster wheel assembly according to claim 1, wherein an elastic potential energy within said coil spring is adjustable to affect a stiffness of said suspension.

5. The lawn maintenance vehicle caster wheel assembly according to claim 4, further including a threaded fastener, wherein said elastic potential energy within said coil spring is adjusted by said threaded fastener.

6. The lawn maintenance vehicle caster wheel assembly according to claim 5, wherein said threaded fastener is located within a central space of said coil spring.

7. A lawn maintenance vehicle caster wheel assembly including a suspension comprising:
    a fork, wherein said fork is rotatably connected to a structural member of an associated lawn maintenance vehicle;
    an arm, wherein said arm is rotatably connected to said fork at a first location, wherein said arm is rotatable about an arm axis;
    a caster wheel mounted to said arm, wherein said caster wheel is rotatable about a wheel axis;
    a damping member, wherein said damping member is attached to said fork and said arm such that said caster wheel and said arm can rotate about said arm axis;
    a pin attached to said arm, wherein said pin defines an aperture; and
    a threaded fastener, wherein said threaded fastener is threadingly engaged with said aperture.

8. The lawn maintenance vehicle caster wheel assembly according to claims 1 or 7, wherein said fork comprises:
    a first fork side; and
    a second fork side, wherein the first fork side and the second fork side are located on opposing sides of said caster wheel.

* * * * *